G. E. MILLER & E. B. CANTRELL.
ROTARY JOINT OIL RETAINER.
APPLICATION FILED OCT. 11, 1915.

1,212,089.

Patented Jan. 9, 1917.

WITNESSES:
Charles Rekes
Thos. Kastberg

INVENTORS
George E. Miller
Owen E. Cantrell
by George Townsend
ATTORNEYS

UNITED STATES PATENT OFFICE.

GEORGE E. MILLER AND EDWIN B. CANTRELL, OF SAN FRANCISCO, CALIFORNIA.

ROTARY-JOINT OIL-RETAINER.

1,212,089.  Specification of Letters Patent.  Patented Jan. 9, 1917.

Application filed October 11, 1915. Serial No. 55,208.

*To all whom it may concern:*

Be it known that we, GEORGE E. MILLER and EDWIN B. CANTRELL, citizens of the United States, residing in the city and county of San Francisco and State of California, have invented new and useful Improvements in Rotary-Joint Oil-Retainers, of which the following is a specification.

Our invention relates to improvements in means to prevent the escape or leakage of oil in connection with shafts and like running joints.

It consists of an oil containing housing, an elastic gasket, through which a revoluble shaft may pass, and, in conjunction with this, of a washer collar or surface in contact with the gasket face, and having upon it a scroll-like groove which continually turns toward the center, in contact with the gasket, so as to resist the tendency of oil to leak outward at this point.

It also comprises details of construction which will be more completely explained by reference to the accompanying drawings, in which—

Figure 1:
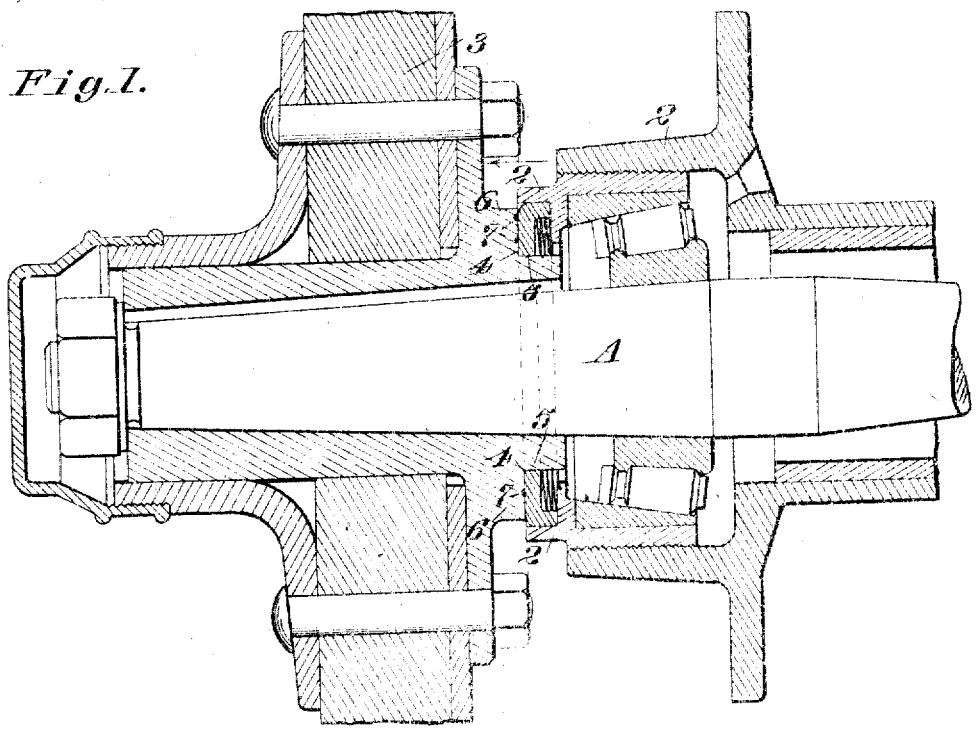
Figure 2:
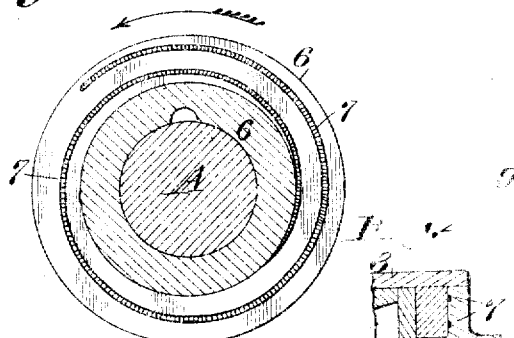
Figure 3:
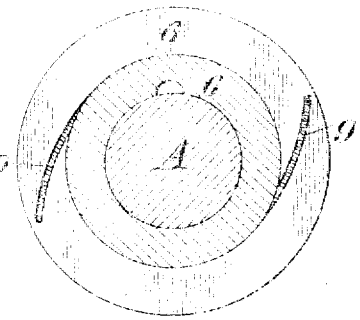
Figure 5:
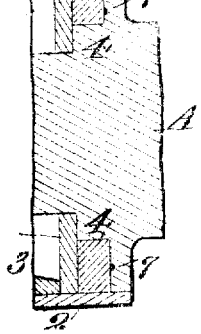

Figure 1 is a view of a shaft in partial section, showing our invention. Fig. 2 is a cross section on line 2—2, Fig. 1. Fig. 3 is a similar section, showing tangentially disposed grooves in place of the scroll shown in Fig. 2. Fig. 4 is a partial section of a wheel hub and axle in which the packing gasket is secured or carried in the revolving member. Fig. 5 is a view of a gasket having grooves cut in the face thereof.

As shown in the drawings, A is a shaft or axle which may turn in ball or other bearings, and 2 is a housing for said bearings, through which the shaft extends and may have a wheel 3 secured to its outer end, as in automobile construction. Great difficulty is experienced in preventing oil from this housing from leaking out and being discharged upon the wheel and tires, to the great detriment of the latter and the general disfigurement of the wheel. In order to prevent such leakage, we have shown a circular gasket or closure 4 for the outer end of the housing, having a central opening 5 of larger diameter than the shaft A which passes through it. Said gasket or end is made of flexible, elastic material and is preferably convexed outwardly, as shown. The wheel hub or an equivalent flange or collar 6, upon the shaft, runs in contact with the outwardly projecting edge of the opening, and in order to return any oil reaching this point and preventing its escape, outwardly, the hub or flange 6 has a scroll cut upon it, as at 7.

In the case of an automobile, there will be two bearing and propelling wheels and the scrolls, here shown as grooves, are so cut that they run from the outer ends inwardly, and thus constantly exert a wiping effect against the edges of the openings to carry the oil inwardly and prevent its overflowing outwardly upon the wheels or other near parts.

It will be understood that the scroll surface may be formed upon either the stationary part or upon the revolving part, and the surface against which it is in contact may be substantially flat; the action of the scroll-like surfaces being in either case such as to carry the oil or other substance inward toward the center.

In Fig. 3 a modification is shown to the extent that in place of a continuous scroll-shaped groove a plurality of tangentially disposed grooves 9 have been provided. We also wish it understood that the grooves may be cut either in the face of the contacting part, as shown, or in the face or body of the gasket proper, as at 10 (see Fig. 5).

Having thus described our invention, what we claim and desire to secure by Letters Patent is—

1. In combination with a rotatable element having a cut-out, a member having a cut-out which confronts the first named cut-out, and a gasket in the cut-outs convexed outwardly and extending across the joint between the cut-outs, the gasket abutting the element and one of the latter two parts having means to conduct oil into the member.

2. In combination with a rotatable element having a cut-out forming a vertical wall, a member having a cut-out which confronts the first named cut-out and forming a horizontal wall, and a gasket in the cut-outs having a vertical face and having a peripheral portion which closes the joint between the cut-outs and which at its periphery engages the horizontal wall of the member, said vertical face of the gasket abutting said vertical wall of said element, and one of said last named parts having means to return oil to the member.

In testimony whereof we have hereunto set our hands in the presence of two subscribing witnesses.

GEORGE E. MILLER.
EDWIN B. CANTRELL.

Witnesses:
GEO. H. STRONG,
J. H. HERRING.